United States Patent [19]

Van Meter

[11] 4,271,020
[45] Jun. 2, 1981

[54] VALVE FOR FILTER DEVICE
[75] Inventor: Arch Van Meter, Barrington, Ill.
[73] Assignee: Ryder International Corporation, Arab, Ala.
[21] Appl. No.: 87,419
[22] Filed: Oct. 22, 1979
[51] Int. Cl.³ ................ B01D 27/10; B01D 35/14
[52] U.S. Cl. ..................... 210/133 Q; 210/421; 210/424; 137/599.1; 137/625.29; 251/175
[58] Field of Search ............... 210/97, 133, 134, 282, 210/284, 287, 288, 421, 424, 440, 443, 444, 454, 450; 137/599.1, 625.29; 251/175; 55/312, 313, 314; 92/49

[56] References Cited
U.S. PATENT DOCUMENTS

| 3,130,952 | 4/1964 | Meyer | 251/175 |
| 3,387,816 | 6/1968 | Holycross | 251/175 |
| 3,907,688 | 9/1975 | Close | 210/424 |

Primary Examiner—Charles N. Hart
Assistant Examiner—David R. Sadowski

Attorney, Agent, or Firm—Trexler, Wolters, Bushnell & Fosse, Ltd.

[57] ABSTRACT

A valve assembly for a fluid filter includes a rotatable valve spindle movable with respect to the value housing and having first and second channels communicating with the filter, the channels also communicating with first and second bores of the housing when the spindle is in a first position in which fluid flows through the filter. The valve spindle further includes a third channel to provide a bypass around the fluid filter when the spindle has been rotated to a second position. The valve spindle also includes seal means for sealing the first and second bores when in the second or filter bypass position, which means includes a pair of chambers arranged to be aligned with the bores and a seal member within each chamber arranged to seal the respective bores. Each seal member has an aperture providing communication between its chamber and its respective bore to allow fluid to enter and charge the chambers for forcing the seal members against the bores in fluid tight sealing engagement therewith.

3 Claims, 4 Drawing Figures

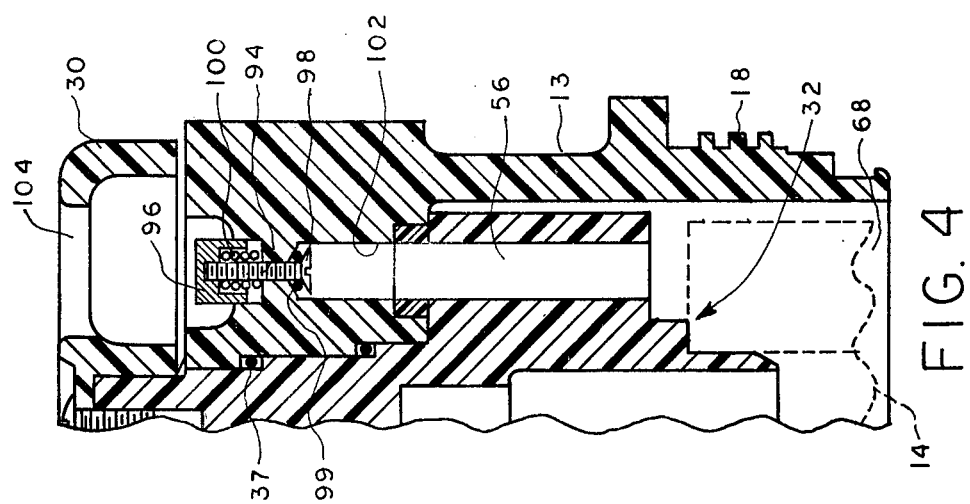
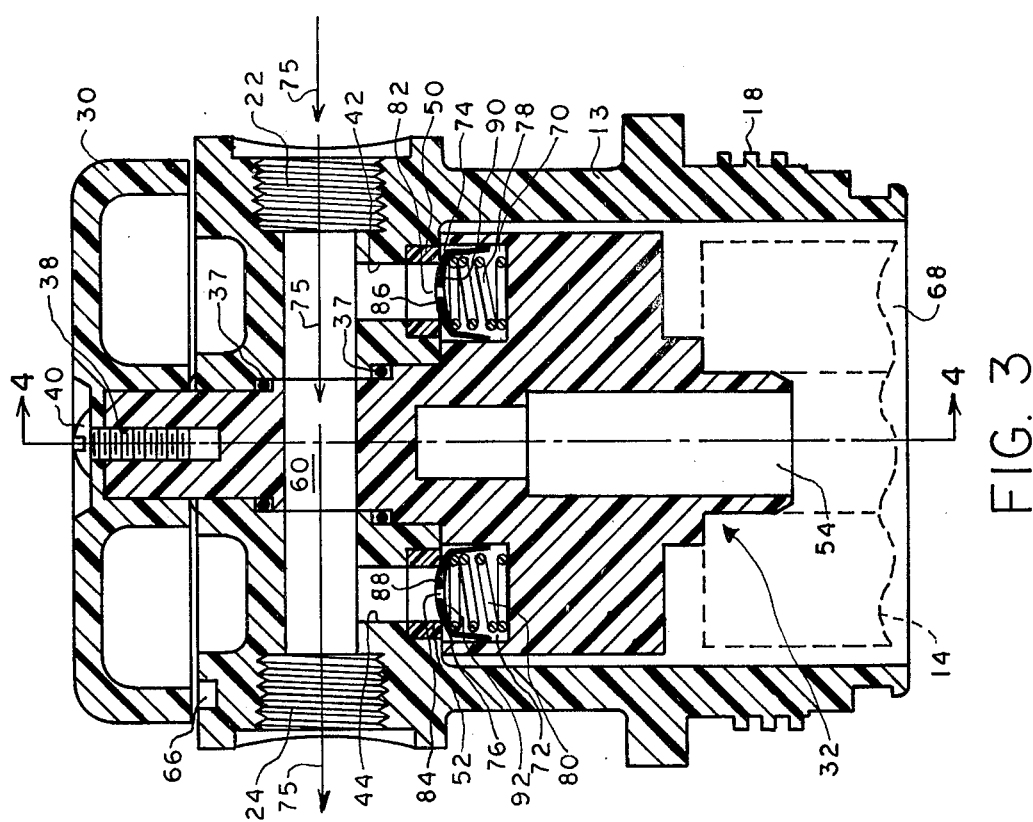

VALVE FOR FILTER DEVICE

BACKGROUND OF THE INVENTION

The present invention is directed to a valve assembly for use with a fluid filter, which valve assembly establishes a first fluid flow path to place the filter in the flow path of the fluid to be filtered and a second fluid flow path bypassing the filter to facilitate removal and replacement of the filter.

There are many instances wherein the taste and odor of household tap water can be improved by filtering certain impurities or minerals from the water. To that end, filters are known which contain a suitable filtering medium such as activated charcoal. Such filters usually take the form of replaceable filter cartridges which are tubular in configuration.

To facilitate removal of the filter cartridges, valve assemblies are known which establish selectable fluid flow paths for the water, one flow path including the filter cartridge, and another flow path bypassing the cartridge. The last-mentioned flow path allows the water to be used while affording the user with an opportunity to remove and replace the filter cartridge.

Water filter assemblies primarily take two different forms. One form is directly mountable to a water faucet. The other form may be employed in a water line upstream from the water faucet in an inconspicuous place, such as below a sink, or within the home main water line. Both forms may utilize the aforementioned valve assemblies which establish selectable paths for the water to facilitate the removal and replacement of the filter cartridges.

When the valve assemblies are placed into the filter bypassing mode, they have had a tendency to leak. Such leakage is not particularly serious in the case of a faucet mounted filter assembly because the leaking water merely drips into the sink. However, in the case of a filter assembly mounted below a sink, in a kitchen cabinet, for example, the leaking water may go undetected for an extended period of time and cause damage to the bottom panel of the cabinet.

It is therefore an object of the present invention to provide a new and improved water filter assembly which does not leak when placed into a filter bypass mode.

It is a more particular object of the present invention to provide an improved valve assembly of the type stated for use in such a filter arrangement which provides selectable fluid flow paths for the water and which does not leak when placed in a filter bypass mode.

The invention therefore provides a valve arrangement for use in a fluid filter assembly having a fluid filter. The valve arrangement comprises a housing adapted to retain the fluid filter and having an inlet adapted to be coupled to a source of fluid to be filtered, an outlet, and first and second bore means communicating with the inlet and outlet respectively, and a valve member within the housing which is movable with respect to the housing between first and second position for establishing a first fluid flow path between the inlet and the outlet which includes a fluid filter and a second fluid flow path between the inlet and the outlet which bypasses the fluid filter. The valve member includes first and second channels arranged for communicating with the fluid filter and arranged to communicate with the first and second bore means respectively when the valve member is at the first position for establishing the first fluid flow path which includes the fluid filter, a third channel arranged for direct fluid communication between the inlet and the outlet when the valve member is at the second position for establishing the second fluid flow path which bypasses the fluid filter, and seal means for sealing the first and second bore means when the valve member is at the second position. The seal means comprises first and second seal members arranged to engage the first and second bore means respectively and arranged to be held in fluid tight engagement with the bore means by a force created by the pressure of the fluid flowing between the inlet and the outlet. The seal member has a through aperture communicating the bore with the chamber to allow the fluid to enter and charge the chamber for forcing the seal member against the bore in tight fluid sealing engagement therewith.

BRIEF DESCRIPTION OF THE DRAWINGS

FIG. 3 is a cross-sectional view similar to FIG. 2 illustrating the valve assembly in a second mode of operation which mode establishes a second water flow path that bypasses the filter cartridge and which also illustrates the inventive sealing arrangement of the present invention; and FIG. 4 is a fragmentary cross-sectional view of the valve assembly of FIG. 1 taken along line 4—4 of FIG. 3.

DESCRIPTION OF THE PREFERRED EMBODIMENT

Figure 1:
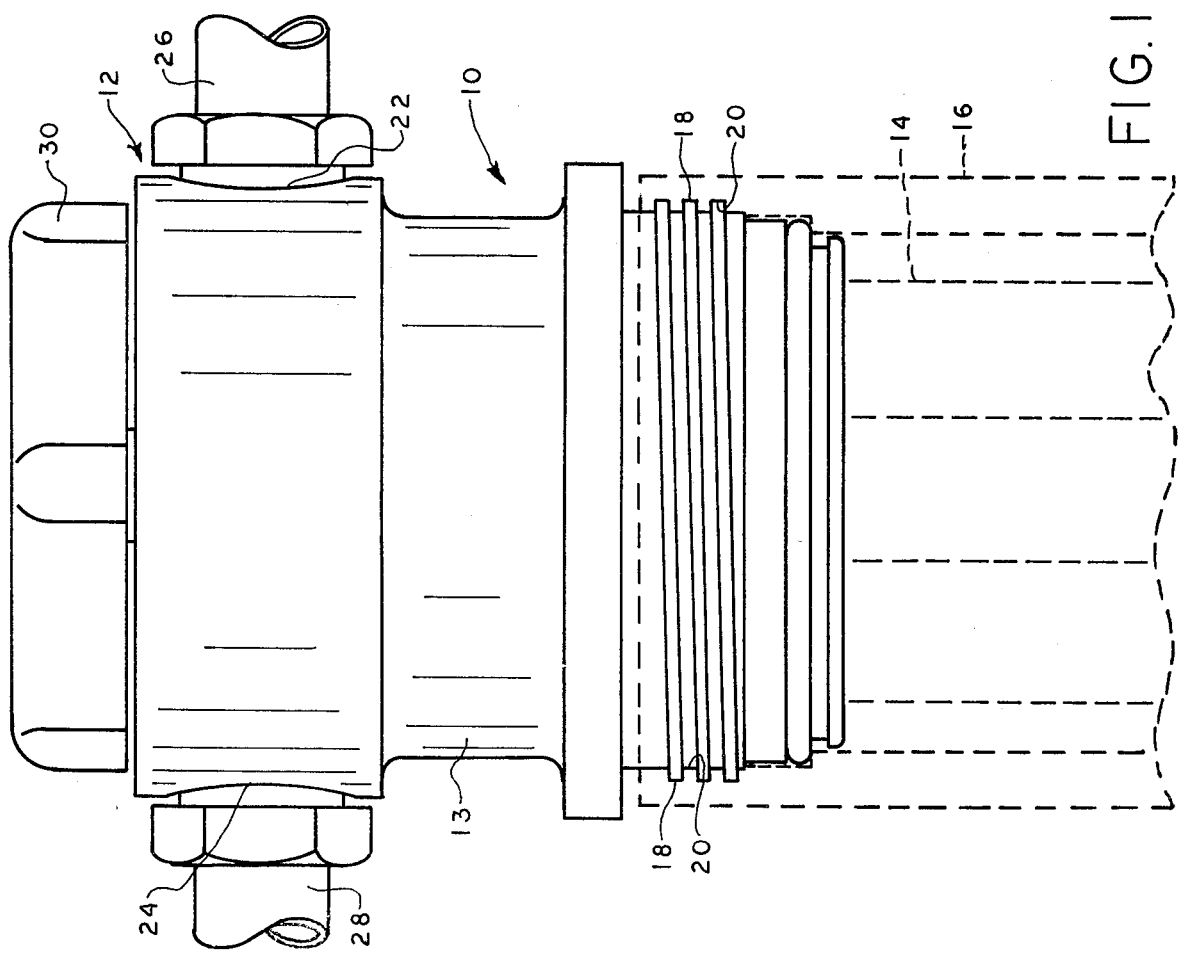
FIG. 1 is a side elevational view of a water filter cartridge housing and valve assembly of this invention and showing also a filter cartridge (in dashed lines) secured in operative relation.

Referring now to FIG. 1, there is shown a fluid filter arrangement 10 which includes a valve assembly 12 embodying the present invention and a filter cartridge 14 (shown in broken lines) disposed in operative relation thereto within a filter housing 16. The valve assembly 12 is generally cylindrical in configuration and includes at its lower extent an external thread 18 for threadingly engaging an internal thread 20 of the housing 16 to secure the housing 16 to a valve housing 13. Disposed within the housing 16 is the filter cartridge 14 which makes fluid communication with the internal structure of the valve assembly 12 in a manner to be described hereinafter.

Figure 2:
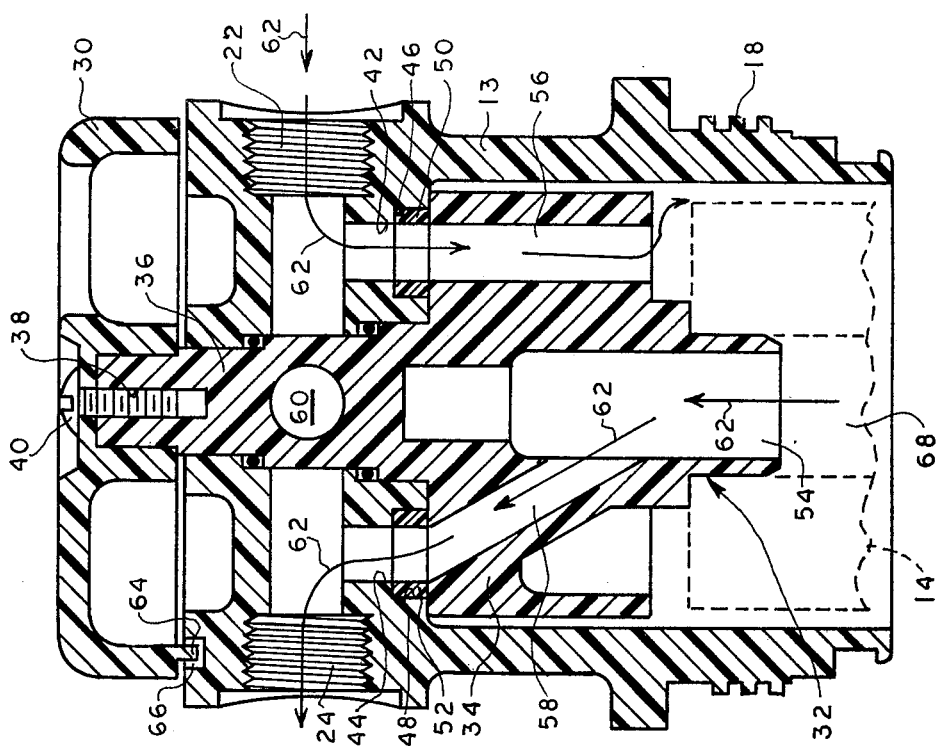
FIG. 2 is a cross-sectional view of the assembly of FIG. 1 taken along the center line of the device and illustrating the valve assembly in a first mode of operation, which mode establishes a water flow path that includes the filter cartridge.

The valve assembly 12 includes an inlet 22 and an outlet 24 which are adapted to be coupled to water conduit on pipes 26 and 28 respectively. The valve assembly 12 further includes a turret cap coupled to a rotatable valve spindle 32 that is within the housing 13. When the valve spindle is at a first position there is established a first fluid flow path from the inlet 22 to the outlet 24 which includes the filter cartridge 14 (FIG. 2). When the valve spindle 32 is rotated to a second position (FIG. 3) upon manually turning the turret cap 30, there is established a second fluid flow path directly between the inlet 22 and outlet 24 which bypasses the cartridge 14. When the valve spindle 32 is in the second or bypassing position, removal and replacement of the cartridge 14 is facilitated. In order to remove and replace the filter cartridge 14, it is only necessary to separate the housing 16 from the valve housing 13 by unscrewing the filter cartridge housing 16 from the housing 13.

Referring now to FIG. 2, it can be seen that the valve spindle 32 includes a lower, generally cylindrical body portion 34 and a reduced diameter upper stem portion 36. The stem portion 36 includes a threaded bore 38 which receives a screw 40 for securing the turret cap 30 to the valve spindle 32. O-rings 37, 37 prevent leakage past the valve spindle 32, FIGS. 3 and 4.

The valve assembly housing 13 includes, in addition to the inlet 22 and the outlet 24, first and second bores 42 and 44 which communicate with the inlet 22 and outlet 24 respectively. The bores 42 and 44 each include a circumferential recess or counterbore 46 and 48 respectively. The recesses 46 and 48 are dimensioned for receiving resilient annular bearing or sealing members 50 and 52 respectively.

The valve spindle 32 includes a central channel 54, a first channel 56, a second channel 58 and a third channel 60. The first and second channels 56 and 58 are arranged to be in fluid communication with the bores 42 and 44 respectively when the valve spindle 32 is at its first or filtering position (FIG. 2). The first channel 56 and the channel 58 are also in fluid communication with a lower cavity 68 of the housing which receives the filter cartridge; thus the channels 56 and 58 are in fluid communication with the inlet and discharge sides of the filter cartridge. Thus, the channel 56 directs fluid to be filtered to the input or outside surface of the filter cartridge and the channel 54 provides a connection to the central bore or output side of the filter cartridge. The channel 58 is in fluid communication with the central channel 54 and extends upwardly at an angle to be in fluid communication with the bore 44.

As a result, when the valve spindle 32 is at its filtering or first position as shown in FIG. 2, fluid entering the inlet 22 passes from the inlet to the first bore 42, into the first channel 56, into the filter cartridge contained within cavity 68, out of the cartridge into central channel 54, into the second channel 58, through the second bore 44, and out the outlet 24, thereby providing a first flow path 62.

The arcuate extent or limits of rotation of the turret cap 30 is controlled by a pin 64 depending fom the cap 30 and projecting into a recess 66 within the upper surface of the housing 13. The recess 66 is arcuate in extent and defines, in cooperation with the pin 64, a limit of rotation for the cap 30. When the pin engages one end wall of the recess 66, the valve spindle 32 will be in the position in FIG. 2; when the cap 30 and valve spindle 32 are rotated to bring the pin 64 into abutment against the opposite end wall of the recess 66, the valve spindle will be in its second or filter bypass position, as shown in FIG. 3.

In FIG. 3 it can be seen that the valve spindle 32 further includes first and second cylindrical chambers 70 and 72 which are displaced from the first and second channels 56 and 58 of the valve spindle 32 by 90°. As a result, the chambers 70 and 72 are arranged to be aligned with the first and second bores 42 and 44 when the valve spindle 32 is at its second position (FIG. 3). Within the chambers 70 and 72 there are disposed cup-shaped sealing members 74, 76 respectively; and biasing the seals 74, 76 are coil spring 78, 80, respecitvely. The sealing members 74 and 76 each include a central aperture 82 and 84 respectively. The apertures 82 and 84 provide fluid communication between the first and second bores 42 and 44 and the first and second chambers 70 and 72 respectively.

The sealing members 74 and 76 have upper arcuate exterior surfaces 86, 88 and lower arcuate interior surfaces 90, 92. The surface areas of the arcuate surfaces 86 and 88 (which are exposed to the first and second bores 42 and 44) are less than the surface areas of the arcuate surfaces 90 and 92 (which are exposed to or adjacent to the first and second chambers 70 and 72). Additionally, the arcuate surfaces 86 and 88 are arranged to engage sealingly the annular bearing members 50 and 52.

As can be seen from FIG. 3, the third channel 60 provides direct fluid communication from the inlet 22 to the outlet 24 to establish flow path (indicated by arrows 75) which bypasses the cavity 60 and thus the fluid filter. Because fluid enters the inlet 22, passes through the third channel 60 of the valve spindle, and then exits the valve assembly from outlet 24, it can be seen that fluid will also enter the first and second bores 42 and 44. Fluid entering the first and second bores 42 and 44 will flow into the first and second chambers 70 and 72 by virtue of the fluid communication between the bores and the chambers provided by the central apertures 82 and 84 of the sealing members 74 and 76. Fluid will enter the chambers 70 and 72 until the chambers are filled with fluid. Because the surface area of arcuate surfaces 90 or 92 exposed to the fluid within the chambers is greater than the surface area of the arcuate surface 86 or 88 exposed to the bores 42 and 44, fluid entering the chambers 70 and 72 will force the seal members 74 and 76 into fluid tight sealing engagement with the edges of the annular bearing members 50 and 52. This results because of the greater surface areas of the arcuate surfaces 90 and 92 presented toward chambers 70, 72 as compared to the surface areas of arcuate surfaces 86 and 88 presented to the bores 42 and 44. Hence, a force is established on each sealing member 74, 76 to cause the sealing members to be urged against the bearing members 50, 52. In addition, the biasing action of the coil springs 78 and 80 provide additional force for the sealing engagement beween the sealing members 74 and 76 and the bearing members 50 and 52.

Referring now to FIG. 4, it can be seen that the valve spindle 32 further includes a pressure relief valve 94 which includes a press button 96, an inverted cone shaped portion 98 that seats against valve seat 99, and a biasing spring 100. The relief valve 94 is disposed within a third bore 102 of the housing which makes fluid communication with one of the first or second channels (for example, channel 56) for relieving any pressure which may be contained within the filter cartridge before the removal and replacement thereof. Access to the relief valve 94 is provided by an opening 104 within the turret cap 30. When it is desired to relieve pressure within the filter cartridge, it is only necessary for the user to depress the press button 96 which causes the inverted cone portion 98 lift off of seat 99. As a result, the pressure within the filter cartridge may be relieved through the channel 56, and bore 102.

From the foregoing, it can be appreciated that the present invention provides a new and improved valve assembly for use in a fluid filter arrangement. The present invention further provides a fluid seal arrangement which utilizes the pressure of the fluid (which may be equal on opposite sides of each member 74, 76) to establish the required force for sealing engagement between the sealing member and the bore which it seals. As a result, leakage from the valve assembly is prevented when the valve assembly is in its bypassing mode of operation for facilitating the removal and replacement of its associated filter cartridge.

The invention is claimed as follows:

1. A valve assembly for use in a filter, said valve assembly comprising, a valve housing having an axially extending open end to which a filter arrangement comprised of a filter housing and a filter member maybe affixed, said valve housing further including inlet passage means and outlet passage means, each said inlet and outlet passage means being spaced from the other and each including a bore portion extending generally axially of said open end, with a resilient sealing member disposed about the open end of each said bore portion, a valve member rotatably carried by said valve housing, said valve member including first and second generally axially extending channels, and a third channel disposed transversely of said first and second channels, said first axially extending channel adapted to be aligned with the bore portion of said inlet passage means, and said second axially extending channel adapted to align with the bore portion of said outlet passage means when the valve member is in a first position, such that fluid entering said inlet will pass into a filter arrangement attached to said valve, and from said filter arrangement through the second channel to said outlet passage means, said third channel being out of engagement with said passage means when said valve member is in said first position, but being disposed such that upon movement of the valve member to a second position, said third channel will establish direct communication between said inlet and said outlet passage means thereby bypassing said filter arrangement, with said first and second channels being out of alignment with said bore portions when the valve member is in said second position, and auxiliary sealing means for sealing said valve assembly against leakage past the open ends of said bore portions when said valve member is in said second position, thereby permitting a filter arrangement to be removed from said valve housing, said auxiliary sealing means comprising a pair of chambers formed in said valve member and opening axially toward the open ends of said bore portions, said chambers being spaced to align with said open ends of the bore portions when said valve member is in the second position, a resilient cup shaped seal member disposed in each said chamber, and biasing means in each said chamber urging the associated cup shaped seal member toward the open end of the adjacent bore portion for engagement with the resilient seal disposed about said open end of the bore portion, and a through aperture formed in each cup shaped seal communicating with the associated chamber, and the surface area of each said cup shaped seal member presented to its chamber being greater than the surface area of said seal member presented to the associated bore means, whereby the fluid entering and charging said chamber through said aperture means will force said seal member axially against the annular seal member disposed about the open end of the associated bore portion.

2. A valve assembly according to claim 1, wherein said resilient cup shaped seal members have arcuate exterior surface portions facing said open ends of said bore portions, such that when said valve member is in said second position, said arcuate surface bore portions will partially enter said open ends of the bore portions to facilitate maintaining said valve member in said second position.

3. A valve assembly as defined in claim 1 wherein said housing further includes a relief valve arranged to communicate with and release pressure from one of said first or second channels when said valve member is at said second position to thereby release pressure from said fluid filter.

* * * * *